(12) United States Patent
Hummel

(10) Patent No.: US 10,584,770 B2
(45) Date of Patent: Mar. 10, 2020

(54) SPEED-CHANGE GEARBOX FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

(*) Notice: Subject to any disclaimer, the term of this patent is extended or adjusted under 35 U.S.C. 154(b) by 502 days.

(21) Appl. No.: 15/502,617

(22) PCT Filed: Aug. 4, 2015

(86) PCT No.: PCT/EP2015/067924
§ 371 (c)(1),
(2) Date: Feb. 8, 2017

(87) PCT Pub. No.: WO2016/023792
PCT Pub. Date: Feb. 18, 2016

(65) Prior Publication Data
US 2017/0219051 A1 Aug. 3, 2017

(30) Foreign Application Priority Data

Aug. 12, 2014 (DE) .................. 10 2014 011 921

(51) Int. Cl.
*F16H 3/00* (2006.01)
*F16H 3/093* (2006.01)
*F16H 3/08* (2006.01)

(52) U.S. Cl.
CPC ............ *F16H 3/093* (2013.01); *F16H 3/006* (2013.01); *F16H 2003/0807* (2013.01); *F16H 2003/0826* (2013.01); *F16H 2003/0933* (2013.01); *F16H 2200/0056* (2013.01); *F16H 2200/0073* (2013.01)

(58) Field of Classification Search
CPC . F16H 3/093; F16H 3/006; F16H 3/10; F16H 37/043; F16H 2003/007
(Continued)

(56) References Cited

U.S. PATENT DOCUMENTS 4,957,016 A    9/1990  Amedei et al.
6,095,001 A *  8/2000  Ruehle .................... F16H 3/006
                                                      74/331

(Continued)

FOREIGN PATENT DOCUMENTS

CN    101535680 A    9/2009
CN    103443505 A    12/2013
(Continued)

OTHER PUBLICATIONS

Office Action dated Feb. 11, 2019 in corresponding Chinese Application No. 201580043089.2; 20 pages.
(Continued)

*Primary Examiner* — Ha Dinh Ho
(74) *Attorney, Agent, or Firm* — Maier & Maier, PLLC

(57) ABSTRACT

The invention relates to a speed-change gearbox for a motor vehicle, provided with shiftable gearwheel sets (gears), which are arranged in a first and in a second sub-gearbox, wherein the sub-gearboxes are provided respectively with at least one input shaft and a common drive shaft and the input shaft that can be alternately activated via a power shiftable clutch. In order to achieve a functionally expanded shifting strategy, it is proposed that at least one gearwheel set can be associated with both sub-gearboxes.

14 Claims, 8 Drawing Sheets

(58) Field of Classification Search
USPC .................................. 74/330, 331, 333, 340
See application file for complete search history.

(56) References Cited

U.S. PATENT DOCUMENTS

| | | | | |
|---|---|---|---|---|
| 7,127,961 | B2* | 10/2006 | Braford | F16H 61/0009 74/340 |
| 7,472,617 | B2* | 1/2009 | Nicklass | F16H 3/006 74/331 |
| 7,878,083 | B2* | 2/2011 | Nicklass | F16H 3/006 74/330 |
| 8,826,760 | B2* | 9/2014 | Feldt | F16H 57/0446 74/335 |

FOREIGN PATENT DOCUMENTS

| | | |
|---|---|---|
| DE | 3131156 A1 | 2/1983 |
| DE | 68913356 T2 | 9/1994 |
| DE | 10122084 A1 | 12/2001 |
| DE | 102011089167 A1 | 6/2013 |
| EP | 2669547 A1 | 12/2013 |
| GB | 2103317 A | 2/1983 |

OTHER PUBLICATIONS

Office Action dated Jun. 27, 2018 in corresponding Chinese Application No. 201580043089.2; 18 pages.
German Office Action dated Jul. 27, 2015 of corresponding application No. DE102014011921.1; 5 pgs.
International Search Report dated Nov. 16, 2015 of corresponding application No. PCT/EP2015/067924; 18 pgs.
Transmittal of Translation of the International Preliminary Report on Patentability dated Feb. 23, 2017, in connection with corresponding International Application No. PCT/EP2015/067924 filed Aug. 4, 2015 (19 pgs.).
Office Action dated Jul. 5, 2019, in corresponding Chinese Application No. 201580043089.2; 18 pages.

* cited by examiner

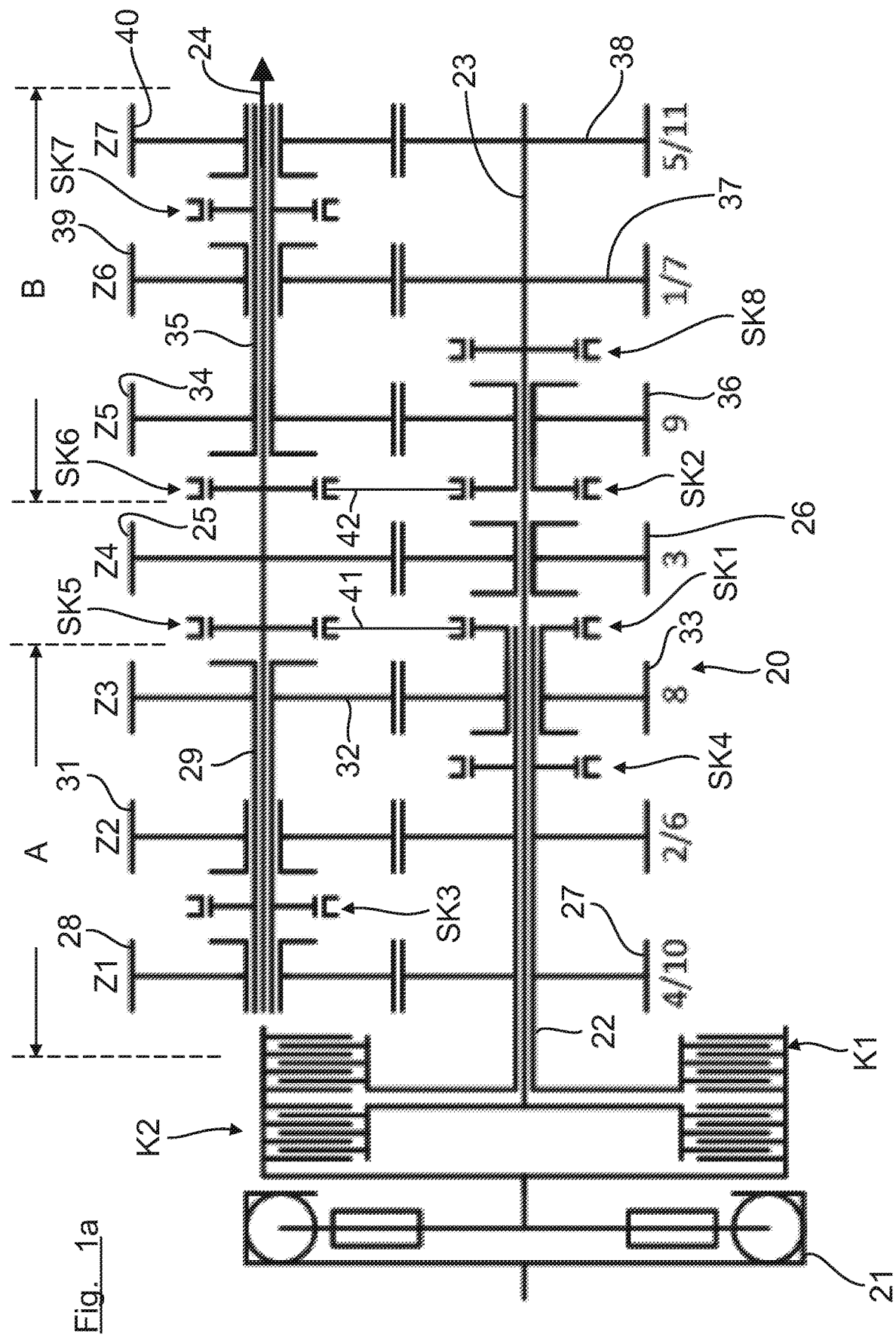

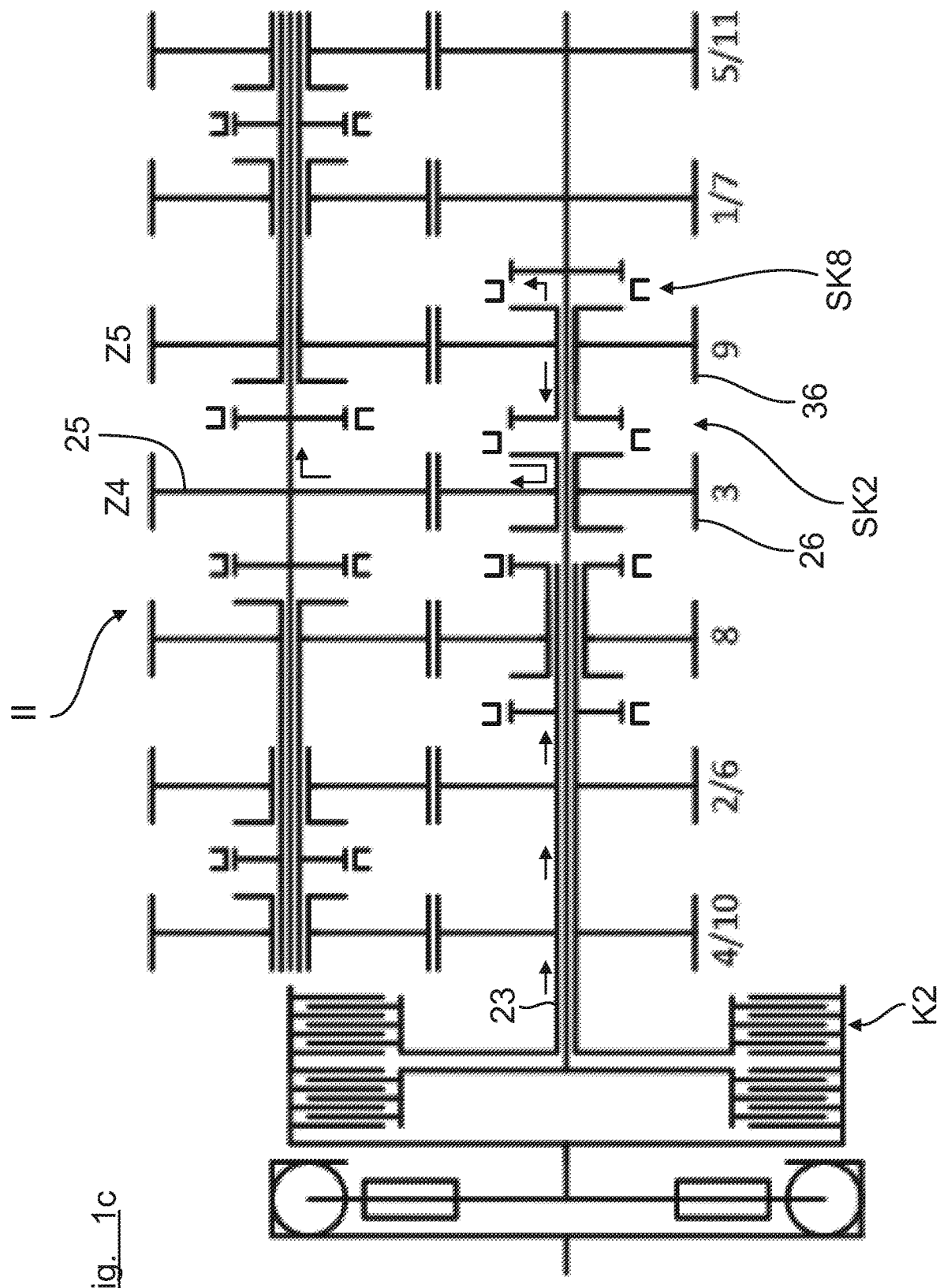

Fig. 2

Fig. 4 target gear

|   | 1 | 2 | 3 | 4 | 5 | 6 | 7 |
|---|---|---|---|---|---|---|---|
| 1 |   | ▨ | ▨ | ▩ | ▨ | ▨ | ▩ |
| 2 | ▨ |   | ▨ | ▨ | ▩ | ▩ | ▨ |
| 3 | ▨ | ▨ |   | ▨ | ▩ | ▩ | ▨ |
| 4 | ▩ | ▨ | ▨ |   | ▨ | ▨ | ▩ |
| 5 | ▨ | ▨ | ▩ | ▨ |   | ▨ | ▨ |
| 6 | ▨ | ▨ | ▩ | ▨ | ▨ |   | ▨ |
| 7 | ▩ | ▨ | ▨ | ▩ | ▨ | ▨ |   | actual gear

Fig. 6 target gear

|   | 1 | 2 | 3 | 4 | 5 | 6 | 7 |
|---|---|---|---|---|---|---|---|
| 1 |   |   |   |   |   |   |   |
| 2 |   |   |   |   |   |   |   |
| 3 |   |   |   |   |   |   |   |
| 4 |   |   |   |   |   |   |   |
| 5 |   |   |   |   |   |   |   |
| 6 |   |   |   |   |   |   |   |
| 7 |   |   |   |   |   |   |   | actual gear

SPEED-CHANGE GEARBOX FOR A MOTOR VEHICLE

BACKGROUND

The present invention relates to a speed-change gearbox for a motor vehicle according to the preamble of claim 1.

Similar gearboxes are also known as so called dual-clutch transmissions and they are frequently used in motor vehicles. In addition to a high efficiency, they also have the advantage that they are in particular automatically switchable without interrupting the traction, wherein a gear can be already preselected in each non-activated sub-gearbox, which is then activated with the change of the shift-switchable clutch. It is therefore useful when the odd gears (1, 3, 5, etc.) are positioned in one sub-gearbox, and in the other sub-gearbox are positioned the even gears (2, 4, 6, etc) by means of corresponding gearwheel sets, which are operationally connected for instance via synchronous clutches with the respective input shaft or output shaft.

SUMMARY OF THE DISCLOSURE

The object of the invention is to provide a speed-change gearbox, which allows for a greater degree of freedom for an advantageous construction and in the functionality, as well as in the design of the gears.

This object is achieved with the features of claim 1. Particularly advantageous further developments and embodiments of the invention are the subject of the dependent claims.

In accordance with the characterizing part of claim 1, an additional intermediate gearwheel set is provided for gear shifting, in particular to shift to a second gear or a third gear. The additional intermediate gearwheel set is in its first operating position associated with the first sub-gearbox, and in its second operating position it is associated with the second sub-gearbox. The gear of the intermediate gearwheel set can thus be switched either between an activated first sub-gear, or alternatively, activated second sub-gear. This makes it possible to reduce the number of the gear levels (gearwheel sets) that are required for a given number of gears. In addition, a greater degree of freedom is enabled for the gear ratio control, for example with downshifting or when a gear skips.

The invention is intended, although not exclusively, for a driving situation in which a vehicle that has an engaged high gear, (for instance the fifth gear), is operated at a constant driving speed and the speed must suddenly be accelerated, for example to start an overtaking maneuver. In this case, the gearbox control device can initiate downshifting from an activated fifth gear, for example to the third gear.

With a conventional dual-clutch transmission, direct downshifting from the fifth to the third gear is not possible because both the fifth gear as well as the third gear are associated with the same sub-gearbox. Based on existing technology, it is therefore time-consuming when one has to first downshift from the fifth gear to the fourth gear and subsequently from the fourth gear to the third gear.

In contrast to that, according to the invention, the third gear can be represented by the above-described intermediate gearwheel set, which can be switched on either with an activated first sub-gearbox or with an activated second sub-gear box, which is to say that it can be associated both with the first as well as with the second sub-gearbox.

In the driving situation described above, the intermediate gear is therefore associated with the still deactivated intermediate gearwheel set. In this manner, direct downshifting from the fifth to the third gear is enabled—while the fourth gear is bypassed.

In a preferred embodiment of the construction design, the fixed gear of the intermediate gearwheel set can be arranged for this purpose on a common drive shaft, while the idler gear can be coupled with a gear element (for example with the input shaft) of the sub-gearbox A, or of the sub-gearbox B.

Only seven gear levels can thus be used for example with a transmission having 11 gears thanks to multiple use of the gearwheel set, wherein the jointly used gearwheel set is arranged centrally between each three gearwheel sets of both sub-gearboxes. The intermediate gearwheel set can in this case represent a shiftable gear in both sub-gearboxes, preferable a 2. or 3. gear. Accordingly, depending on the remaining gear arrangements in the sub-gearboxes, a frequently occurring downshifting pattern can be controlled automatically, among other things.

In an advantageous development of the invention, five gear levels can be used with a 7-gear transmission, wherein an intermediate gearwheel set is arranged centrally between each two gear levels of the sub-gearboxes A and B, and particularly advantageously representing a 1., 2., and 3. gear above both gearbox elements A and B. This is achieved by enabling gear elements to function in both sub-gearboxes as reduction gearing, which can in each case produce the gear ratio with the central gearwheel set.

For this purpose, it is further proposed that two input shafts be provided in the sub-gearbox A, and one input shaft in the sub-gearbox B, which can be activated on the input side via three shift-switchable clutches, wherein the two input shafts of the sub-gearbox A turn off at least each of the gearwheel sets of the sub-gearbox A and the input shaft of the sub-gearbox B on the at least two gearwheel sets of the sub-gearbox B.

In a particularly advantageous embodiment configuration of the transmission, the gearwheels of the gear levels 1, 2 and 4, 5 of the sub-gearboxes A, B can be respectively attached to a common hollow shaft, wherein they are rotatably mounted on a joint drive shaft and can be coupled via shift clutches with the drive shaft. This enables a particularly compact and convenient multiple use of the gearwheel sets representing both the slow, but also the fast design of the gear ratios.

The gear elements of both sub-gearboxes can be further designed in their construction in such a way that they activate at the same time the common gearwheel set between the sub-gearboxes A and B in the shift clutches in the operational sequence of the switching gear selectors on the drive shaft, and at least on one input shaft. This makes it possible to reduce the number of the gear selectors required for the switching operations and to simplify their control.

With a transmission design having three gears that can be realized via a common gearwheel, the 2. gear can be used in an advantageous manner via the sub-gearbox A and the sub-gearbox B.

In this case, shift-switchable downshifting of both the gears of the sub-gearbox A, as well as of the gears of the sub-gearbox B, can be controlled and switched in the 2. gear. It is particularly preferred when with five gear levels and 7 gears, the gears 7, 5 can be arranged in the sub-gearbox A, and the gears 6, 4 can be arranged in the sub-gearbox B.

Finally, with a hybrid drive of the motor vehicle, an internal combustion engine and an electric motor are connected to it coaxially and connected with an input shaft on the clutch housing, wherein the motor vehicle can be driven with shift-switchable clutches so that it can be controlled via the common changeover gear and operated with the internal combustion engine and/or with the electro motor. It is in this case preferred when another, shift-switchable clutch K0 is arranged between the internal combustion engine and the downstream-connected electric motor for decoupling of the internal combustion engine.

BRIEF DESCRIPTION OF THE DRAWINGS

Several embodiments of the invention are described in detail below with reference to the attached figures, which show:

FIG. 1a a block diagram of a speed-change gearbox for motor vehicle, provided with a dual clutch and 11 shiftable forward gears;

FIGS. 1b and 1c diagrams corresponding to FIG. 1a showing the intermediate gearwheel set in a first operating position (FIG. 1b) and in a second operating position (1c);

FIG. 2 a switching matrix of the changeover gear according to FIG. 1;

Figure 4:
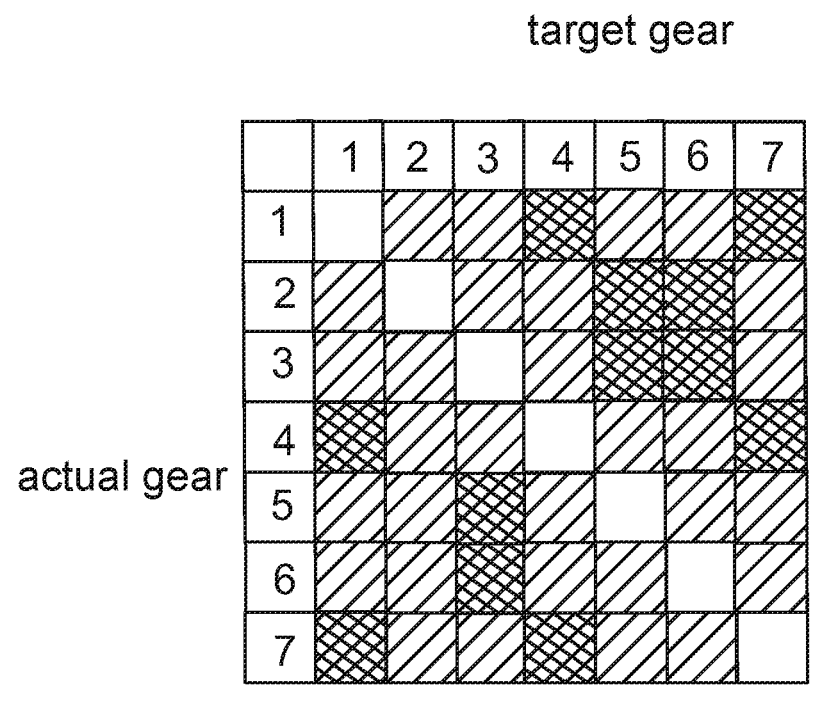

FIG. 4 a switching matrix of the changeover gear according to FIG. 3;

FIG. 6 a switching matrix corresponding to the changeover gear according to FIG. 5

DETAILED DESCRIPTION OF THE DRAWINGS

Figure 1B:
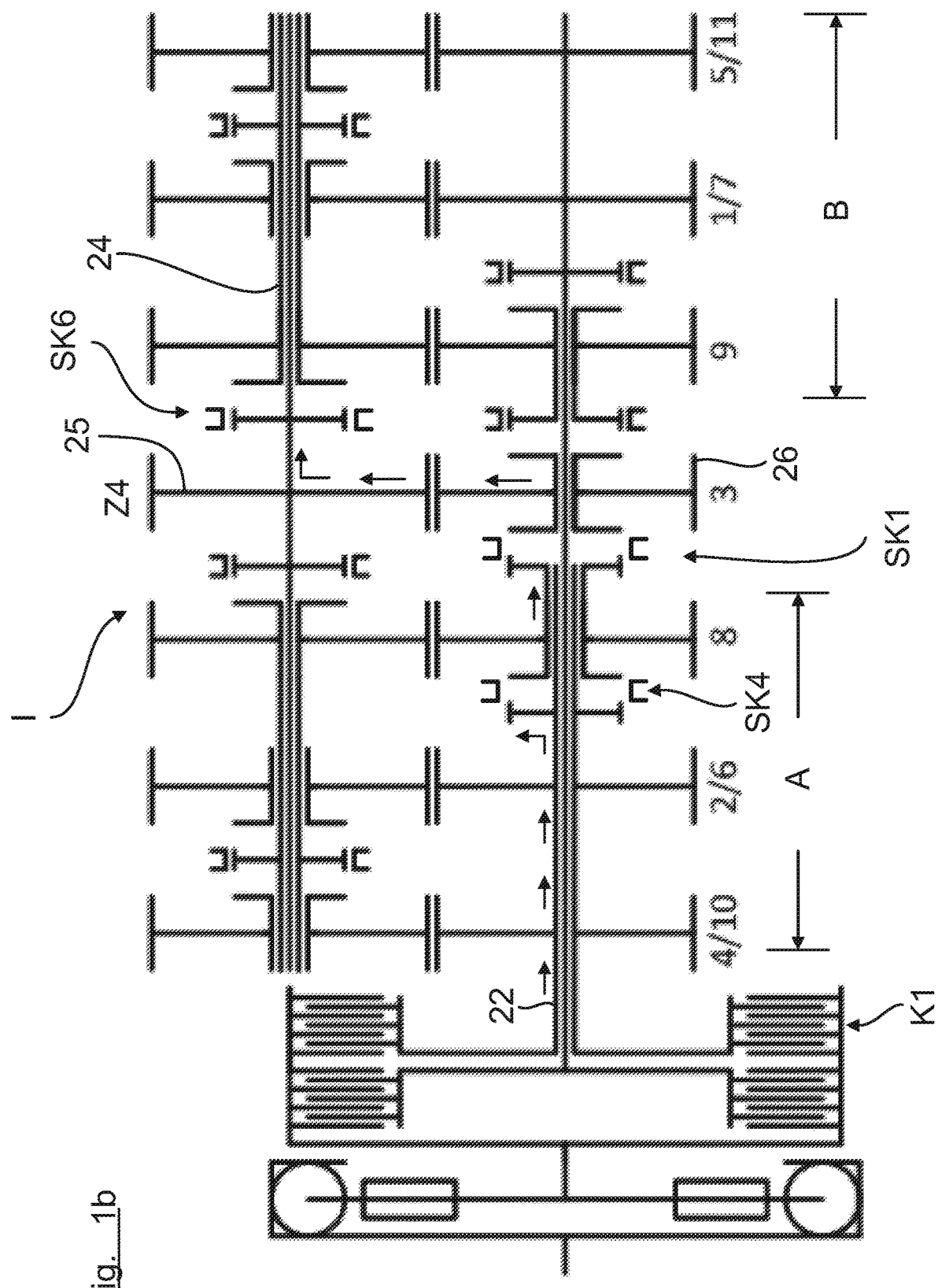

In FIG. 1a is illustrated a speed-change gearbox or a dual-clutch gearbox 20 for motor vehicles, by means of which seven gear levels or seven gearwheel sets can be switched to eleven forward gears 1 through 11.

The changeover gear 20 is provided with two engines, for instance with an internal combustion engine (not shown) that can be driven via a torsional vibration damper (21), and via two shift-switchable clutches K1, K2 that can be alternately activated with input shafts 22, 23, wherein one of them, the input shaft 22, is a hollow shaft, through which is introduced the second input shaft 23. The rotary bearing and the corresponding gear housing are not shown.

The gearwheel sets Z1 through Z7 are arranged in a known manner on the input shafts 22, 23 on a common output shaft 24 in a manner that will be described later, wherein the gearwheel sets Z1 through Z3 form a sub-gearbox A, and the gearwheel sets Z5 through Z7 form a sub-gearbox B.

The intermediate gearwheel set Z4, on the other hand, is arranged with a fixed gear 35 on the drive shaft 24 and with a switchable idler gear 26 on the input shaft 23 between both sub-gearboxes A and B in such a manner that idler gear 26 can be coupled via shift clutches SK1 and SK2 either with the sub-gearbox A or with the sub-gearbox B.

The arrangement of the remaining gearwheel sets is created in such a way that the forward gears can be realized with only seven gearwheel sets, Z1 through Z7, wherein:

The fixed gear 27 is arranged from Z1 on the input shaft 22 and its idler gear 28 is arranged on an hollow shaft 29 mounted coaxially to drive shaft 29;

the fixed gear 30 is arranged from Z2 also on the input shaft 22 and its idler gear 31 is also arranged on the hollow shaft 29;

both idler gears 28, 31 can be alternately coupled by means of a shift clutch SK3 with the hollow shaft 29 the fixed gear 32 of Z3 is arranged on the hollow shaft 29, while its idler gear 33 can be coupled via a shift clutch SK4 with the input shaft 22, or via the shift clutch SK1 with the intermediate gearwheel set Z4 or its idler gear 26; the hollow shaft 29 can be operationally connected via a shift clutch SK5 with the drive shaft 24;

the fixed gear 34 of the gearwheel set Z5 is attached to another hollow shaft 35, which is rotatably mounted on the drive shaft 24, while the idler gear 36 of the gearwheel set Z5 is mounted on the input shaft 23 of the sub-gearbox B and coupled by means of the shift clutch SK2 with the idler gear 26 of the intermediate gearwheel set Z4;

the hollow shaft 35 can be coupled via another shift clutch SK6 with the drive shaft 24;

the fixed gearwheel sets 37, 38 of the gearwheel sets Z6 and Z7 are arranged on the input shaft 23, while their idler gears 39, 40 are mounted on the hollow shaft 35 and can be shifted by means of the shift clutch SK7 to the hollow shaft 35; and the shift clutches SK1, SK5 and the shift clutches SK2, SK6 can be jointly activated via respective gear selectors 41, 42 (as indicated by the dashed line) in order to alternatively close the shift clutches SK1 or SK5, or SK 2 or SK6.

Figure 2:
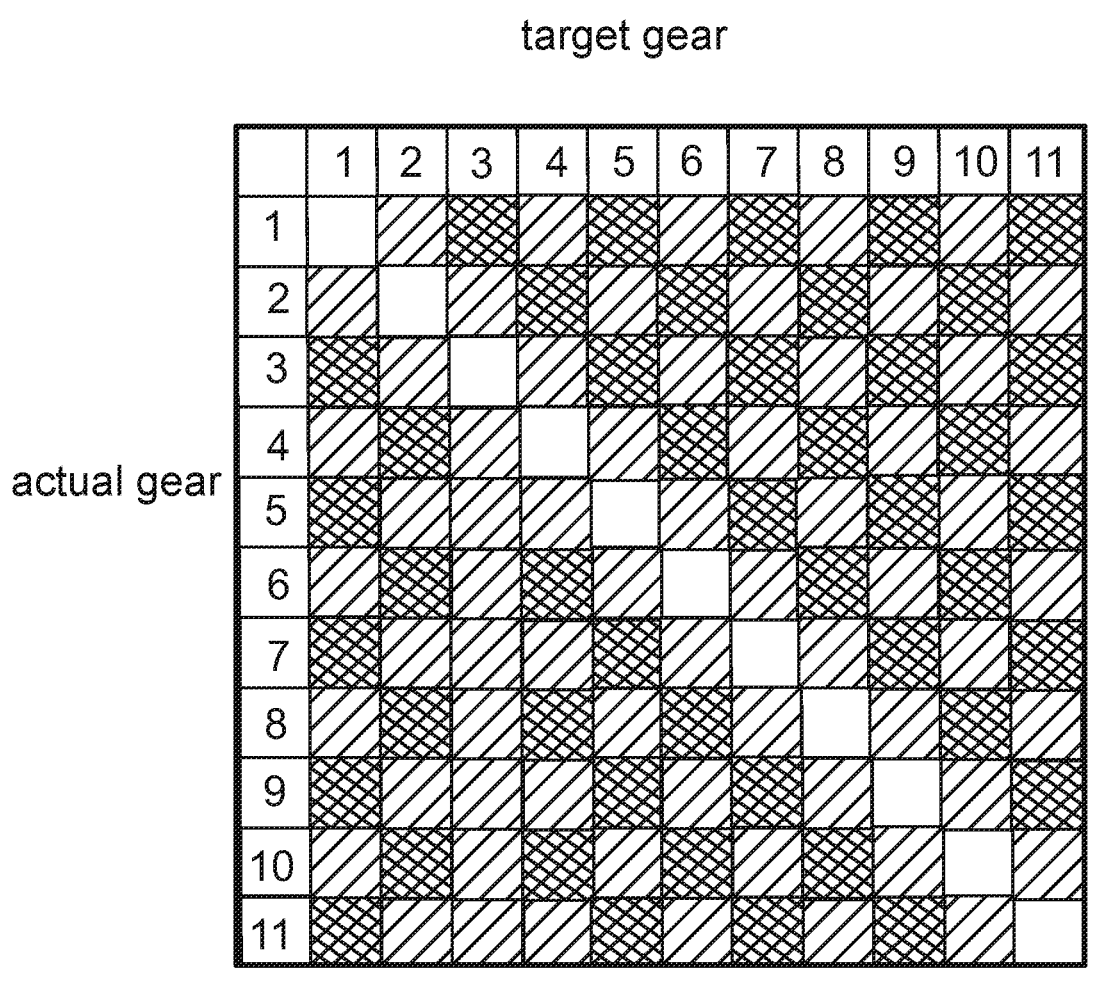

The forward gears 1 through 11 (a reverse gear, which may be required, is not shown), can be switched on according to the switching matrix of FIG. 2. In the upper horizontal line of the switching matrix are listed the pre-selectable target gears, while in a lateral vertical column are listed actual gears. The vertical column and the horizontal line create a map with a plurality of boxes that symbolize all combinations of target gears and actual gears. If a box is diagonally hatched, the associated gear combination is switchable without an interruption in tractive force. If a box is crosshatched, the associated gear combination is not switchable without an interruption in tractive force.

The intermediate gearwheel set Z4 for the 3. gear can be used for both sub-gearboxes A and B, so that for example downshifting from a higher gear to the 3. gear is controllable, namely from a higher gear of both sub-gearboxes A or B.

For this purpose, the intermediate gearwheel set Z4 is associated in a first operating position I (FIG. 1b) with the first sub-gearbox A, and in a second operating position II (FIG. 1c) with the second sub-gearbox B. In this manner, the 3. gear can be switched on either with activated first sub-gearbox A (FIG. 1b), or with activated second sub-gearbox B (FIG. 1c).

The power flow is indicated in FIG. 1b with arrows. For example, the power flow proceeds with a closed powershift clutch K1 through the input shaft 22 and the connected switching element SK1 and SK4 to the idler gear 26 of the intermediate gearwheel set Z4, and further through its fixed gear 25 to the drive shaft 24.

As shown in FIG. 1c, the power flow is indicated by the arrows with a closed powershift clutch K2 as proceeding via the input shaft 23, and with a closed switching element SK8 to the idler gear 36 of the gearwheel set Z5, and further through the connected switching element KS2 to the idler gear 26 of the intermediate gear Z4, and further through the fixed gear 25 to the drive shaft 24.

For example, the 3. gear can be connected via the sub-gearbox A with a closed clutch K1, and also in sub-gearbox B with a closed clutch K2 and accordingly connected shift clutches SK1 through SK8.

Figure 3:
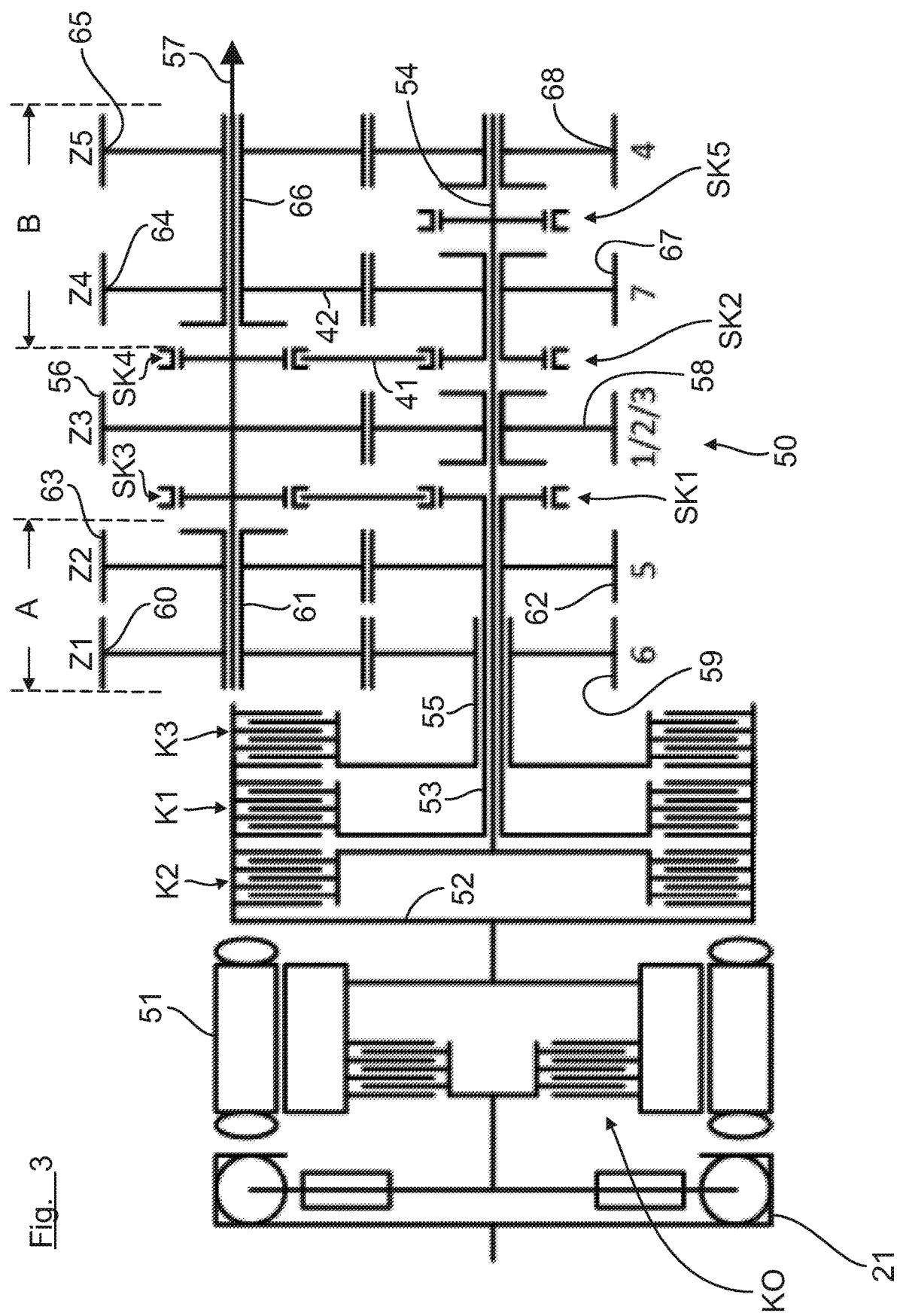
FIG. 3 another changeover gear for a hybrid-driven motor vehicle provided with three shift-switchable clutches and 7 forward gears.

FIG. 3 shows an embodiment of the invention that is based on a dual-clutch transmission 50 for a hybrid-driven motor vehicle, wherein an internal combustion engine (not shown) is used for driving operations via a torsional vibration damper and an electro motor 51 in a housing 52 for three shift-switchable clutches K1, K2, K3. The internal combustion engine can be coupled through another shift-switchable clutch of the electro motor 51.

The three clutches K1, K2, K3 are used for driving operations with three coaxial input shafts 53, 54, 55, among which the input shafts 53, 55 are hollow shafts.

The transmission 50, which has up to seven gears 1 through 7, is equipped with five gear levels or gearwheel sets Z1 through Z5, among which the gearwheel sets Z1 and Z2 are associated with the sub-gearbox A and the gearwheel sets Z4 and Z5 are associated with the sub-gearbox B.

The intermediate gearbox Z3 can be used—in the same manner as the intermediate gears Z4 of FIG. 1a through 1b—for both sub-gearboxes A and B and cover gears 1, 2, 3 as outlined below.

In this case, the fixed gear 56 is arranged on the axis-parallel, common output shaft 57 of the gear 50, while its idler gear 58 is rotatably mounted on the input shaft 54 of the sub-gearbox B and can be operationally connected by means of shift clutches SK1, SK2 on both sides with the adjacent gear elements as described below:

the gearwheel set Z1 is provided with two fixed gears 59, 60, which are fixed to the input shaft 55 that is connected with the clutch K3, and to the hollow shaft 61 that is rotatably mounted on the drive shaft 57;

the gearwheel set Z2 is also formed with two fixed gears 62, 63, which are arranged on the input shaft 53 of the clutch K1 and on the hollow shaft 61; the input shaft 53 can be additionally coupled with the idler gear 58 of the gearwheel set Z3 by means of the shift clutch SK1;

the hollow shaft 61 can be coupled on the drive shaft 57 via a shift clutch SK 3 with the drive shaft 57;

the gearwheel set Z4 and the gearwheel set 75 are provided with fixed gears 64, 65, which are fixed on a hollow shaft 66, which is rotatably mounted on the drive shaft 57; the hollow shaft 66 can be coupled via a shift clutch SK4 with the drive shaft 57;

the idler gears 67, 68 of the gearwheel sets Z4 and Z5 are rotatably arranged on the input shaft 54, and they can be alternately operationally coupled via another shift clutch SK5 with the input shaft 54;

The gears 1 through 5 can be realized through multiple use of the gearwheel sets Z1 through Z5, wherein the shift clutches SK1, SK3 and the shift clutches SK2, SK4 are again activated as described above in connection with FIG. 1 via common gear selectors 41, 42. In this manner, only three gear selectors are required for shifting the gears. FIG. 4 shows only the controllable matrix for the gear 50 according to FIG. 3, which is illustrated similarly to FIG. 2.

In the FIG. 3 are represented gears 1, 2, 3 with the intermediate set Z3. The following power flow processes occur with the shifting of the gears 1, 2, 3:

1. Gear: clutch K2, input shaft 54, shift clutch SK5 closed for gearwheel set Z5 and via the hollow shift 66 further for the gearwheel set Z4, via the shift clutch SK2 for the intermediate gearwheel set Z3, and finally for the drive shaft 57;

2. Gear: clutch K1, input shaft 53, via closed shift clutch SK1 for the idler gear 58 of the intermediate gearwheel set Z3, output through the fixed gear 56 and drive shaft 57; and 3. Gear: clutch K3, input shaft 55, gearwheel set Z1 on the gearwheel set Z2, input shaft 53, shift clutch SK 1 on the gearwheel set Z3, drive shaft 57.

In addition, the intermediate gearwheel set Z3 of FIG. 3 can be alternatively associated both with the first sub-gearbox A and with the second sub-gearbox B, so that the second gear of the intermediate gearwheel set Z3 can be shifted either with an activated first sub-gearbox A, or with an activated sub-gearbox B.

With the assignment of the intermediate gearwheel set Z3 to the first sub-gear box A, the following power flow is created: for example, when the power flow with a closed power shift clutch K1 via the input shaft 53 and the connected switching element SK1 to the idler gear 58 of the intermediate gearwheel set Z3, and further via its fixed gear 56 to the drive shaft 57.

With the assignment of the intermediate gear Z3 to the second sub-gearbox B is created a power flow that takes place with a closed power shift clutch K2 via the input shaft 54 and the connected switching element SK5 to the idler gear 67 of the gearwheel set Z4, and further via the connected switching element SK2 to the idler gear 58 of the intermediate gearwheel set Z4, and further via its fixed gear 56 to the drive shaft 57.

Figure 5:
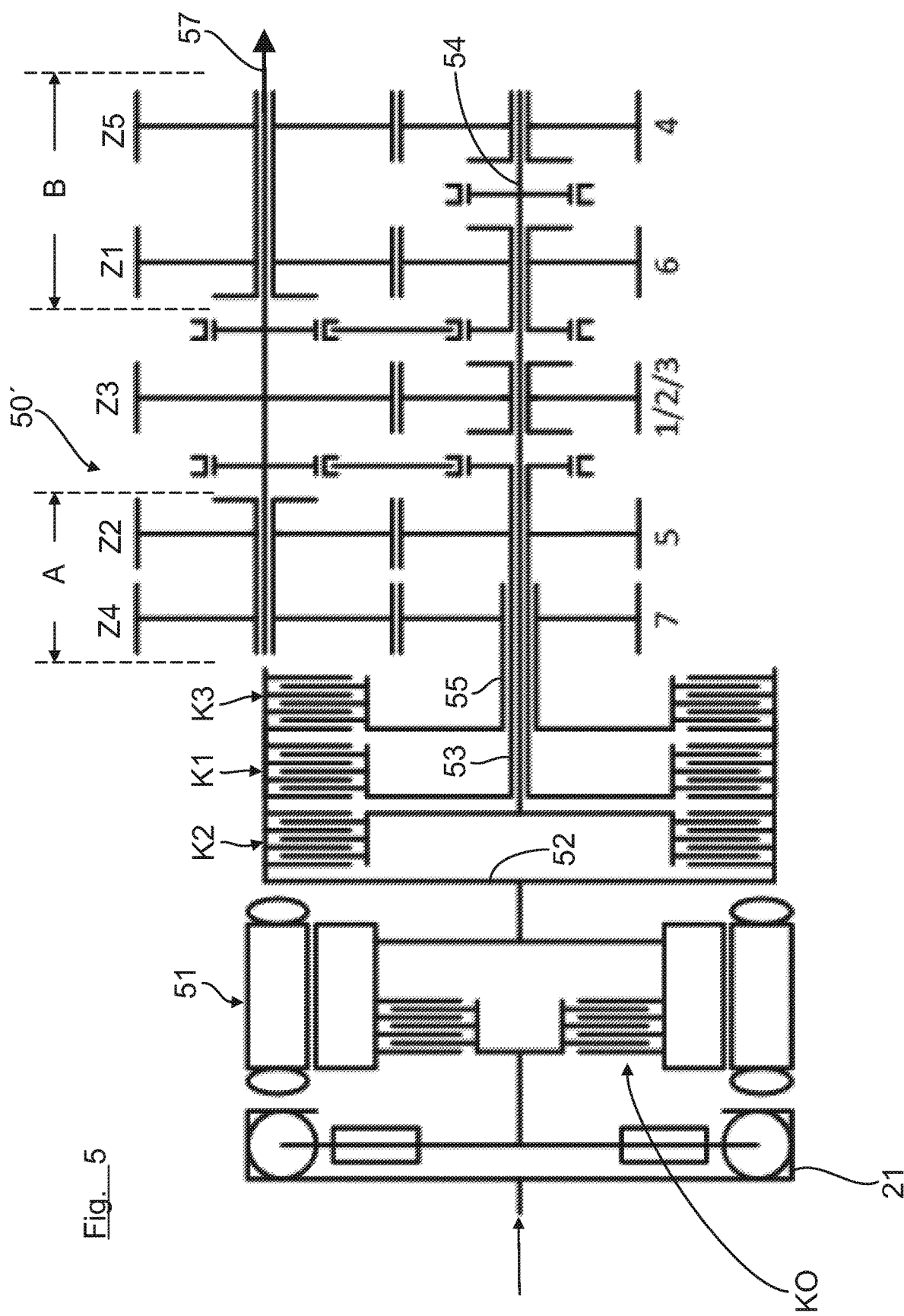
FIG. 5 a changeover gear as an alternative to FIG. 3 provided with a different distribution of the forward gears on both sub-gearboxes.
Figure 6:
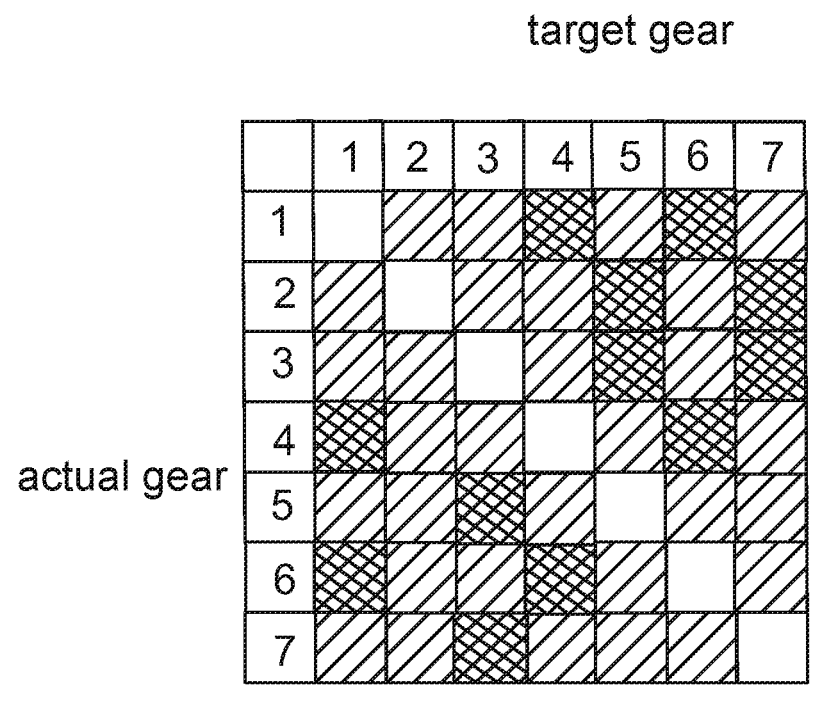

FIG. 5 shows an alternative design to FIG. 3 of a transmission 50', in which the gearwheel sets Z1 and Z4 (6. gear and 7. gear) are swapped between the sub-gearboxes A and B. The switching matrix resulting from it is shown in FIG. 6.

The invention is not limited to the illustrated embodiments. In particular, familiar modifications and combinations will be evident to a person skilled in the art within the scope of the embodiment examples, for instance in the number of the proposed forward gears.

The shift clutches mentioned here can be formed with synchronous clutches that are used for shift transmissions and with power shift clutches with hydraulically activated multi-plate clutches.

The invention claimed is:

1. A shifting gearbox for a motor vehicle, comprising:
   a first sub-gearbox A and a second sub-gearbox, whose sub-gearbox input shafts are connectable with power shift clutches and provide driving output on a common driving shaft, and with gearwheel sets that can be switched on, which are associated for gear shifting with the first sub-gearbox and with the second sub-gearbox, wherein each of the gearwheel sets can be operatively coupled with a gear shift by switching elements with respective sub-gearbox input shafts and with the common drive shaft, and can be activated with a respective one of the power shift clutches by shifting the respective power shift clutch of one of the sub-gearboxes, while the other sub-gearbox is deactivated, wherein an additional intermediate gearwheel set is provided for shifting to a gear, in particular a second gear or a third gear, which is associated in a first operating position with the first sub-gearbox, and in a second operating position with the second sub-gearbox, so that the gear of the intermediate gearwheel set is switchable either with activated sub-gearbox or with activated second sub-gearbox,
   wherein the fixed gearwheel sets of the gearwheel sets of the sub-gearboxes are fixed to respective common hollow shafts, and the hollow shafts of the common drive shaft are rotatably mounted and can be coupled via the switching elements with the common drive shaft.

2. The shifting gearbox according to claim 1, wherein in a driving mode of the motor vehicle, a higher gear is engaged compared to the gear of the intermediate gearwheel set whose gearwheel set is associated with the first sub-gearbox, and that with downshifting of the engaged higher gear to a gear of the intermediate gearwheel set, the intermediate gearwheel set is adjustable in its second operating position, in which the intermediate gearwheel set is associated with the second sub-gearbox.

3. The shifting gearbox according to claim 1, wherein the even gears are associated with the first sub-gearbox and the odd gears are associated with the second sub-gearbox, and that the intermediate gearwheel set is associated with an even or with an odd gear.

4. The shifting gearbox according to claim 1, wherein each of the gearwheel sets is formed from idler and fixed gears, which are arranged in a direction that is perpendicular to respective gear shafts and which can be operationally coupled by the switching elements with the sub-gearbox input shafts and with the common drive shaft.

5. The shifting gearbox according to claim 1, wherein a fixed gear of the intermediate gearwheel set is arranged on the common drive shaft, and a meshing idler set of intermediate gearwheel set is arranged on the sub-gearbox input shafts and can be coupled by switching elements with the first sub-gearbox or with the second sub-gearbox.

6. The shifting gearbox according to claim 1, wherein with a 11-gear transmission, only seven gear levels are formed through multiple use of gearwheel sets, wherein the intermediate gearwheel set is arranged centrally between each three gearwheel sets of both sub-gearboxes.

7. The shifting gearbox according to claim 1, wherein with a 7-gear transmission, five gearwheel sets are used, wherein the intermediate gearwheel set is arranged centrally between each two gearwheel sets of the sub-gearboxes.

8. The shifting gearbox according to claim 1, wherein the intermediate gearwheel set is represented via gear elements, in particular the gearwheel sets and the power shift clutches, having in both sub-gearboxes at least two, in particular three gears of different gear stages, and in particular preferably the 1st, 2nd and 3rd gear.

9. The shifting gearbox according to claim 1, wherein two input shafts are provided in the first sub-gearbox and one input shaft is provided in the second sub-gearbox, which can be activated through three power-shiftable clutches.

10. The shifting gearbox according to claim 1, wherein the two input shafts of the first sub-gearbox drive at least one gearwheel set of the first sub-gearbox and the input shaft of the second sub-gearbox on at least one gearwheel set of the second sub-gearbox.

11. The shifting gearbox according to claim 1, wherein gear selectors which shift the intermediate gearwheel set between the sub-gearboxes in the power flow simultaneously activate the shifting clutches on the common drive shift and at least one of the input shafts.

12. The shifting gearbox according to claim 1, wherein the shifting gearbox is provided with a total of five gear levels and a total of seven switchable gears, and that in the first sub-gearbox is arranged the first and the seventh gear, and in the second sub-gearbox is arranged the fourth and the sixth gear.

13. The shifting gearbox according to claim 1, wherein driving operations are performed in a hybrid drive of the motor vehicle with an internal combustion engine and with an electro motor, connected coaxially on a clutch housing with the input shafts with the power shift clutches.

14. The shifting gearbox according to claim 13, wherein between the internal combustion engine and the electro motor connected downstream is arranged another, power shift clutch.

* * * * *